United States Patent

[11] 3,587,316

[72] Inventor Bastiaan Kapteyn
Orland Park, Ill.
[21] Appl. No. 756,827
[22] Filed Sept. 3, 1968
[45] Patented June 28, 1971

[54] BUBBLE PIPE ATTACHMENT
6 Claims, 5 Drawing Figs.

[52] U.S. Cl. .................................................. 73/302
[51] Int. Cl. .................................................. G01f 2/16
[50] Field of Search ....................................... 73/299,
302, 300, 84

[56] References Cited
UNITED STATES PATENTS
1,670,207 5/1928 Murphy ........................ 73/299

2,603,967 7/1952 Carlson ........................ 73/84X

*Primary Examiner*—Louis R. Prince
*Assistant Examiner*—Harry C. Post, III
*Attorney*—Frank J. Foley ABSTRACT: The liquid level in a tank is determined by suspending an air bubble pipe in the liquid and the pressure on the air is measured as the air bubbles emerge from the lower open end of the pipe. The open end of the pipe is kept open by providing a wiping rod within the pipe. The rod protrudes from the open end of the bubble pipe and blades are attached to the protruding end of the rod. The blades are engageable with the surrounding liquid currents, thus moving the rod and wiping the lower margin of the bubble pipe.

PATENTED JUN28 1971  3,587,316

INVENTOR
Bastiaan Kapteyn
Frank J. Foley
Att'y

BUBBLE PIPE ATTACHMENT

This invention relates to improvements in liquid level indicating mechanisms of the well-known bubble pipe type, which are commonly used in industry for indicating or recording liquid and slurry levels in storage and process tanks.

In such mechanisms, the bubble pipe, often a half-inch pipe, is positioned in a tank with its lower open end close to the bottom of the tank, yet above the level at which a rather permanent layer of sediment may be expected to accumulate. The upper end of the pipe is capped, and into it is slowly supplied a stream of air under such regulated pressure as is sufficient to cause air to slowly escape at intervals as bubbles from the bottom end of the pipe into the surrounding body of liquid and thence upwardly through and from the liquid.

A conventional bubble pipe system includes such regulating valves and gauges as may be required for controlling the entering air and for indicating or recording the pressure of the air so supplied, from which pressure the liquid level may be determined. However, as such valves and guages do not form a part of this invention, they are not described herein.

Experience teaches that as air bubbles emerge from the lower end of a bubble pipe immersed in a slurry they have a tendency to dry solids which they contact, and these solids tend to adhere to the inside of the lower end of the pipe, as indicated in the accompanying drawing. As accumulation increases it restricts the escape of air markedly, thereby causing the bubble system to falsely indicate the liquid level.

Heretofore, it has been necessary to clean out the lower ends of these bubble pipes, sometimes several times a day, by inserting a rod or brush down through the pipe. Repeated unsealing and resealing of the cap at the top end of the pipe induces wear and leakage, which itself produces false readings.

In accordance with this invention, a slender rod is suspended within the bubble pipe and protrudes a short distance below the end of the bubble pipe. In virtually every tank whose liquid requires measuring, the liquid is subject to some rather constant agitation, in some cases due to the use of positively driven agitators provided for such purpose, or due to the normal entrance of fresh liquid into the tank and normal withdrawal of liquid therefrom, or due to convection currents. I have found that frequently the motion of the liquid in the tank near the bottom thereof will be sufficient to engage even a bare protruding rod and cause it to scrape along the edges of the open end of the bubble pipe to such an extent as will prevent the sediment from adhering to the inside of the pipe resulting from the drying action of the air bubbles. If necessary, however, one or more plates may be secured to the lower end of this protruding rod to assure that the liquid movements will catch and sufficiently agitate the rod.

No mechanism especially designed to agitate the rod is required. As the rod will always keep the lower end of the bubble pipe in the optimum condition, there will be no occasion for disconnecting the mechanism at the top end of the pipe for cleaning out the lower end.

It is the general object of this invention to provide an attachment for a bubble pipe which will be actuated by the liquid motion in a tank for preventing accumulation of air dried or air modified solids within or at the lower end of the bubble pipe.

Another object is to provide an attachment of the foregoing character which will operate unattended by human personnel and will eliminate the need for opening up a bubble pipe for cleaning its lower end.

Referring now to the drawing.

Figure 1:
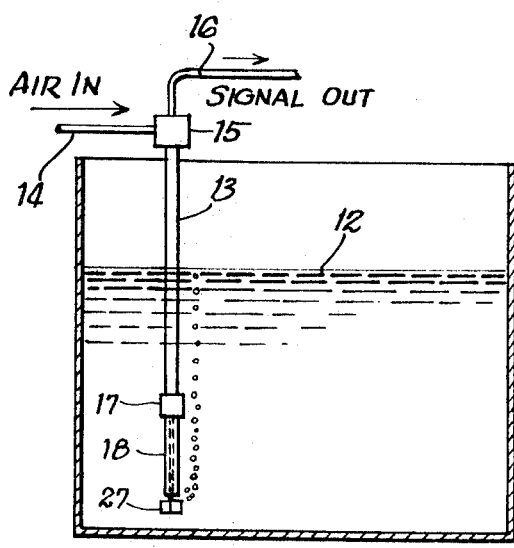
FIG. 1 is an illustrative vertical sectional view showing one form of this invention attached to the lower portion of a bubble pipe.

Referring now to FIGS. 1 to 4 inclusive, there is shown an open tank 11 containing a slurry, for example, having an existing level at 12. A bubble pipe 13 is supported by any suitable means, not shown, to depend into the tank. At its upper end is shown an air inlet pipe 14, a schematic representation 15 of conventional regulating valves (not forming a part of this invention) and a pipe 16 which may be regarded as leading to a pressure responsive gauge indicating the liquid level, also not a part of this invention.

Secured to the pipe 13 is a threaded union 17 for supporting a bubble pipe extension 18. A spider 19, having ports such as 21 for the passage of air, is seated within pipe 18 on shoulder 22, and provides a seat for a ball 23 to which is connected in any suitable fixed manner, a reduced portion 24 of a wiping rod 25. This rod extends, as shown, well beyond the lower end 26 of the bubble pipe extension 18. If advisable blades such as 27 may be secured, as by welding, or otherwise, to the rod to be engaged by the moving slurry.

Figure 2:
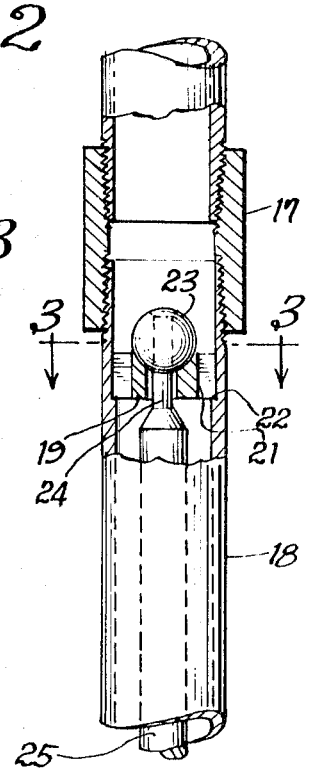
FIG. 2 is an enlarged view, partly in section, of the same attachment.
Figure 3:
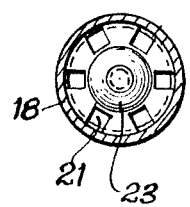
FIG. 3 is a sectional view on line 3–3 of FIG. 2.

In FIG. 2, there is indicated at 28, a deposit of partially dried or air-modified solids which may commonly be found at such position when the wiping rod of this invention is not used.

Figure 5:
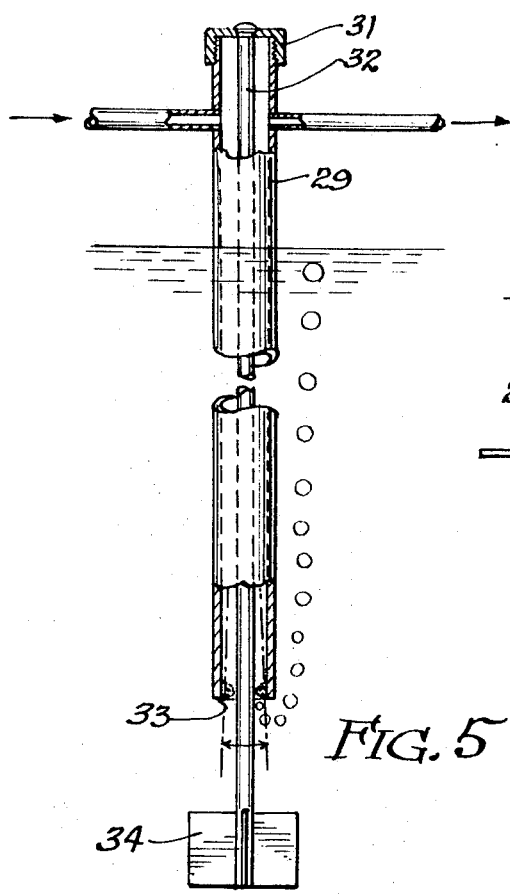
FIG. 5 is an elevational view, partly in section, of a modification of the attachment.
Figure 4:
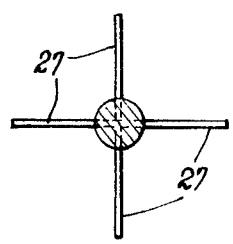
FIG. 4 is a sectional view on line 4–4 of FIG. 2.

In FIG. 5, there is shown a bubble pipe 29, sealed by a cap 31 to which is sealed a wiping rod 32 which extends the full length of the bubble pipe and protrudes beyond the lower end 33. Blades 34, similar to blades 27, may be attached to the protruding end.

Instead of the rod 25 or 32 I may use some other wiping element capable of responding to motion in the liquid body to dislodge sediment accumulations at the outlet of the bubble pipe, and may employ other modifications.

I claim:

1. In combination with a liquid level measuring system having a bubble pipe from whose lower open end a stream of air bubbles emerges into a liquid body in which said pipe is suspended and in which the pressure on the escaping air is measured, an attachment comprising a member and means supporting the member within the pipe with the lower end of the member protruding from said lower end of the bubble pipe, said member having a surface portion below the bubble pipe end which is engageable with surrounding liquid currents effective to cause said member to move and wipe along the margin of the bubble pipe opening and dislodge any accumulations of solids which may adhere to the bubble pipe opening.

2. A bubble pipe attachment in accordance with claim 1 in which the horizontal cross-sectional area of the protruding portion of said member is less than the cross-sectional area of the bubble pipe opening.

3. A bubble pipe attachment in accordance with claim 1 in which the member is a rod extending the entire length of the bubble pipe and protrudes from its bottom end, and the supporting means is positioned in sealing relation on the top of the bubble pipe.

4. A bubble pipe attachment in accordance with claim 1 in which a blade is secured to the protruding end of said member to be engaged by moving currents in the liquid body.

5. A bubble pipe attachment in accordance with claim 1 in which the member is shorter than the entire length of the bubble pipe and the supporting means is positioned within the bubble pipe and is provided with a port permitting passage of air downwardly past the supporting means.

6. A bubble pipe attachment in accordance with claim 1 in which the supporting means includes a detachable pipe extension to be secured to the bubble pipe and the supporting means is secured in said extension with said member protruding from the bottom of said pipe extension.